July 14, 1942.  N. A. CARTER, JR  2,290,034
VEHICLE SPRING ATTACHMENT
Filed April 28, 1941
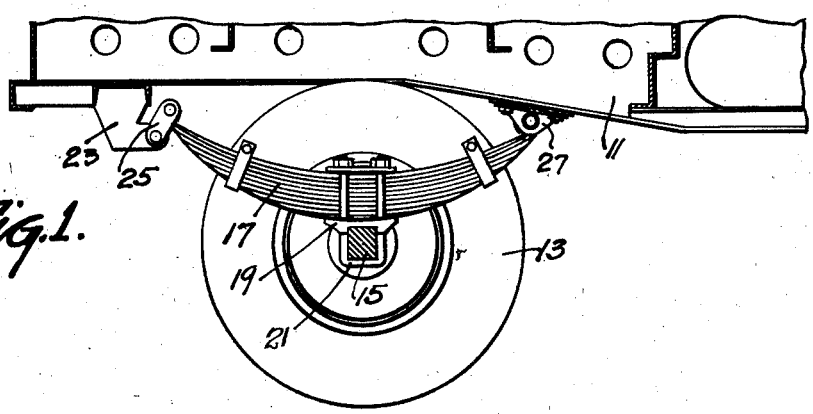
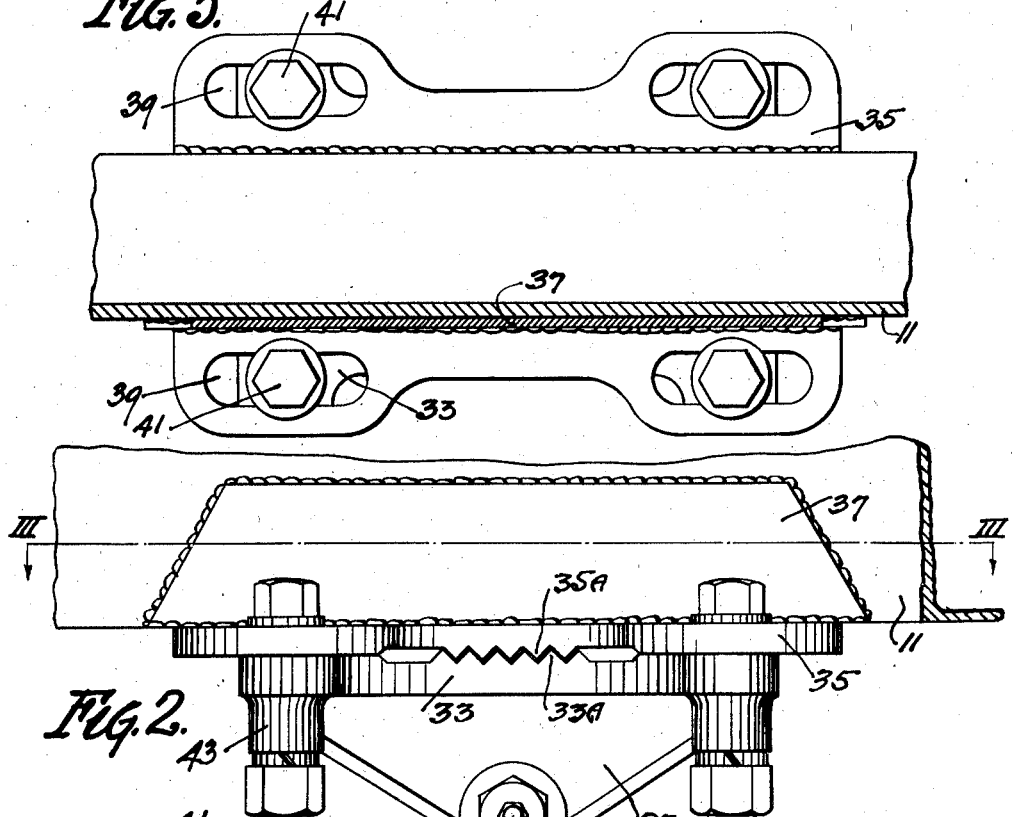
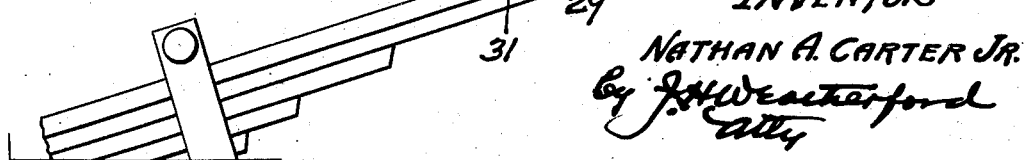
INVENTOR
NATHAN A. CARTER JR.
By J. H. Weatherford
Atty Patented July 14, 1942

2,290,034

UNITED STATES PATENT OFFICE 2,290,034

VEHICLE SPRING ATTACHMENT

Nathan A. Carter, Jr., Memphis, Tenn., assignor to Carter Manufacturing Company, Memphis, Tenn., a partnership Application April 28, 1941, Serial No. 390,642

10 Claims. (Cl. 267—54)

This invention relates to means for accomplishing the alinement of vehicle axles, in which the transverse positioning of the axle relatively to the body is accomplished and maintained by the springs through which the vehicle body is supported by the axle.

In numerous types of vehicles the rear axles have springs mounted directly thereon and rigidly secured thereto with the ends of the springs extending forwardly and rearwardly and secured through shackles and/or suitable brackets to the undersides of the trusses of the vehicle. Many of these employ shackles at both ends and depend upon radius rods to preserve the alinement of the axle. Others have one end of the springs anchored through a rigid bracket to the truss with the opposite end swung by a shackle which permits the necessary lengthening of the spring under load. This latter type of attachment depends on the anchored end of the spring to maintain desired axle alinement and it is to this general type of attachment that the present invention is directed.

It is found at times, after a vehicle with an apparently properly alined axle is put in use that the alinement is incorrect. Also it is found frequently after use that road shocks, or other causes, have destroyed the proper alinement, with the result that there is a tendency of the wheels to run crabwise toward the edge of the road or the center, as the case may be, creating a dangerous condition, and even though in case the displacement may be so slight as not to be dangerous, tire wear often increases unduly. Heretofore in such cases it has been necessary to withdraw the vehicle from service and return it to the maker or to a well equipped shop to make adjustment.

The object of the present device is primarily to provide a simple and dependable means for attaching or anchoring the spring ends in such manner that adjustment, if necessary, may readily and quickly be made and may even be made on the road with the tools usually carried.

The means by which this object is accomplished and the manner of its accomplishment will readily be understood from the following specification on reference to the accompanying drawing in which:

Fig. 1 is a fragmentary longitudinal sectional elevation transverse to the vehicle axle showing a typical set-up.

Fig. 2 is a side elevation of the anchor bracket and the method of its adjustable attachment to one of the vehicle trusses; and Fig. 3 a sectional plan taken as on the line III—III of Fig. 2.

Referring now to the drawing in which the various parts are indicated by numerals:

11 is a fragmentary portion of the rear end of one of the longtudinal vehicle trusses, 13 a vehicle wheel, 15 the vehicle axle, 17 one of the springs which is seated on and secured as through a suitable chair 19, and as by suitable bolts 21 to the axle.

23 is a bracket, and 25 a complementary shackle through which the rear end of the spring is secured to the truss 11, and 27 the anchor bracket through which the forward end of the spring is secured to the truss. The anchor bracket 27 has side walls which lie in usual manner on the opposite sides of the usual eye 29 at the end of the springs, connection being made as through the usual pin 31. The side walls of the bracket are integral with a base plate 33 which is adapted to underlie and seat against a complementary shoe 35, rigidly secured, preferably as by welding, to the underside of the truss member 11, or other equivalent load carrying part of the vehicle.

The shoe 35 may, where conditions suggest or permit, have an upwardly extending flange portion 37 adapted to abut against the side surface of the truss member and assist in alining and securing the shoe to the truss, or otherwise the truss member if needing reinforcement, may be reinforced by a plate which may be of outline conforming to the flange shown, and the shoe attached, as by welding, to the reinforced structure.

The contacting surfaces of the shoe 35 and the bracket 33 are provided with complementary transverse serrations or corrugations 35—A, 33—A, or other deformations which interlock to prevent relative longitudinal displacement of these parts. A limited portion only of the contacting surfaces such as shown may be thus deformed or the deformations may be co-extensive with any desired portion of the entire length of the surfaces.

Both the shoe 35 and the bracket are preferably wider than the truss member to form flange portions, the flange portions of one, usually more conveniently the shoe 35, being provided with parallel, longitudinally disposed slots 39 for bolts 41 and of the other, with bosses 43 which are apertured for the bolts, both the slots and apertures preferably closely fitting the bolts to prevent lateral displacement.

Identical adjustable brackets may be used on the opposite sides of the vehicle. Usually, however, a nonadjustable bracket of the same general type as the bracket 27 is used with the spring on one side of the vehicle and the instant adjustable bracket with the spring on the other side of the vehicle, any one adjustment in either case usually being made on one side of the vehicle only.

In construction, the anchor bracket 27 is centrally positioned with regard to the shoe 35 and the bracket and shoe clamped together as a unit. This unit is positioned on and secured to the vehicle truss or other part of the vehicle body to be supported by the bracket in usual manner, and the anchor bracket for the opposite side and spring is similarly positioned and secured whether it be of the adjustable or rigid type, alining of the springs, brackets and axle being effected in routine manner.

Later should re-alinement be necessary the vehicle truss is jacked up adjacent the anchor bracket to relieve the spring of strain, the bolts 41 are loosened and the bracket moved forward or backward relatively to the shoe 35 the desired amount, usually one notch only, though obviously if greater adjustment is necessary it may be moved two or even more notches. The bolts 41 are again tightened to solidly engage the bracket and shoe and the jack or jacks removed. If the brackets are on both sides obviously the adjustment may be made on either side and in case of excessive adjustment need, could be made part on one side and part on the other, one bracket being moved forward and the other backward. Where only one adjustable bracket is used it preferably is placed on the right hand side of the vehicle so that in case adjustment on the road be necessary the adjustment may be made on the side of the vehicle remote from traffic.

It will be understood that the design and detail of the bracket and shoe will necessarily differ according to the design of spring end and of the understructure to which the base member is to be attached, the essential feature being that the brackets comprise two relatively adjustable complementary parts, one attached in usual manner to the spring and the other in usual or desired manner to the structure to be supported with means for clamping the parts together into a rigid structure.

I claim:

1. In a vehicle having a transverse axle and a frame member, a longitudinally disposed leaf spring rigidly attached at an intermediate portion of its length to, and supported by said axle, shackle means securing one end of said spring to said frame member, means forming a deformed surface on the underside of said member adjacent the opposite end of said spring, a bracket secured to said latter spring end, said bracket having a deformed surface complementary to said member surface, and means cooperating with said bracket and frame member to detachably secure said bracket rigidly to said member in any of a plurality of selected positionings with said deformations inter-engaging to prevent longitudinal displacement of said bracket relative to said member.

2. In a vehicle having a transverse axle and a frame member, a longitudinally disposed leaf spring rigidly attached at an intermediate portion of its length to and supported by said axle, shackle means securing one end of said spring to said frame member, a shoe having its under surface transversely serrated, fixedly secured to said member adjacent the opposite end of said spring, a bracket secured to said latter spring end, said bracket having a serrated surface complementary to said shoe surface and means cooperating with said bracket and said shoe to detachably secure said bracket rigidly to said member in any of a plurality of selected positionings with said serrations interengaging to prevent longitudinal displacement of said bracket relative to said member.

3. In a vehicle having a transverse axle and a frame member, a longitudinally disposed leaf spring rigidly attached at an intermediate portion of its length to and supported by said axle, shackle means securing one end of said spring to said frame member, a shoe having its under surface serrated, fixedly secured to said member adjacent the opposite end of said spring, said shoe being wider than said member to provide extending flange portions, a bracket secured to said latter spring end, said bracket having a serrated surface complementary to said shoe surface, and having flange portions underlying said shoe flange portions, said flange portions being apertured for bolts, at least one set of said apertures being longitudinal slots, and bolts disposed through said apertures to secure said bracket rigidly to said shoe in any of a plurality of selected positionings with said serrations inter-engaging to prevent longitudinal displacement of said bracket relative to said member.

4. In a vehicle having a transverse axle, a load supporting spring disposed longitudinally of said vehicle, supported and rigidly secured adjacent its center to said axle, a swinging shackle attaching one end of said spring to said vehicle and anchor means for securing the opposite end of said spring to said vehicle, said anchor means comprising means forming a deformed surface on said vehicle at the locus of anchor attachment, a bracket having a complementary deformed surface adapted to cooperate with said vehicle surface to prevent relative longitudinal displacement, means for clamping said bracket to said vehicle with said deformed surfaces in engagements, and means securing the latter said spring end to said bracket.

5. Spring attaching means for a vehicle including a shoe adapted for fixed attachment to said vehicle and a complementary bracket adjustably secured thereto, and pin means securing an end of said spring against longitudinal displacement relatively to said bracket; said shoe having a deformed under surface and said bracket a complementary contact surface, and means adjustable in the direction of the length of said spring, cooperable with said deformed surfaces for detachably securing said parts together and against displacement in any of a plurality of adjusted positions.

6. Spring attaching means for a vehicle, said means including a shoe part adapted for fixed attachment to said vehicle, a complementary bracket part, and pin means connecting an end of said spring against longitudinal displacement to said bracket, and bolts for clamping said parts together, said parts having complementary contact surfaces adapted when clamped together to resist longitudinal displacement, and being apertured to receive said bolts, the apertures in at least one of said parts being slots permitting longitudinal shifting of said bolts and of the other said part, when said bolts are loosened.

7. In a vehicle having a transverse axle, a load supporting spring disposed longitudinally of said vehicle, supported and rigidly secured adjacent its mid portion to said axle, a swinging shackle attaching one end of said spring to said vehicle and anchor means for securing the opposite end of said spring to said vehicle, said anchor means comprising a shoe part rigidly secured to said vehicle, and a bracket part, longitudinally displaceable relative thereto, said parts having complementary contact surfaces adapted to prevent said longitudinal displacement when said parts are clamped together, and means for detachably clamping said bracket part to said shoe part, and means securing the latter said end of said spring to said bracket part.

8. In a vehicle having a transverse axle and a frame member, a longitudinally disposed leaf spring rigidly attached at an intermediate portion of its length to, and supported by, said axle, shackle means securing one end of said spring to said frame member, a shoe fixedly secured to, and forming a corrugated surface on the under side of, said member adjacent the opposite end of said spring, a bracket secured to said latter spring end, said bracket having a corrugated surface complementary to said shoe surface, said shoe having flange portions longitudinally slotted and said bracket having flange portions apertured, and bolts disposed through said slots and apertures for clamping said bracket rigidly to said shoe in any of a plurality of selected positions with said corrugations inter-engaging to prevent longitudinal displacement of said bracket.

9. A vehicle having a transverse axle, a load supporting spring disposed longitudinally of said vehicle, supported and rigidly secured adjacent its mid portion to said axle, longitudinally shiftable means attaching one end of said spring to said vehicle, and anchor means for securing the opposite end of said spring to said vehicle, including means forming a deformed surface on said vehicle, means including a bracket secured against longitudinal displacement to the latter said spring-end, said bracket having a deformed surface complementary to said vehicle surface and being longitudinally adjustable relatively to said vehicle, and means for detachably securing said bracket rigidly to said vehicle in desired position of longitudinal adjustment.

10. In a vehicle having a transverse axle, a load supporting spring disposed longitudinally of said vehicle, supported and rigidly secured adjacent its mid portion to said axle, longitudinally shiftable means attaching one end of said spring to said vehicle, and anchor means for securing the opposite end of said spring to said vehicle, said anchor means including two complementary parts adjustable relatively one to the other, longitudinally of said vehicle, said parts having complementary deformed contacting surfaces, means rigidly securing a first of said parts to said vehicle, means for rigidly clamping the second said part to said first part in desired position of longitudinal adjustment, and means for securing the latter said spring-end to, and against longitudinal displacement relatively to said second part.

NATHAN A. CARTER, Jr.